United States Patent [19]
Schreyer

[11] Patent Number: 6,111,941
[45] Date of Patent: Aug. 29, 2000

[54] TELECOMMUNICATION SYSTEM WITH LOOP-FREE SWITCHING TABLES

[75] Inventor: Oliver Schreyer, Herzogenrath, Germany

[73] Assignee: U.S. Philips Corporation, New York, N.Y.

[21] Appl. No.: 09/031,699

[22] Filed: Feb. 27, 1998

[30] Foreign Application Priority Data

Feb. 28, 1997 [DE] Germany ............... 197 08 112

[51] Int. Cl.$^7$ ............................................... H04M 3/42
[52] U.S. Cl. .................. 379/207; 379/219; 379/220; 370/254
[58] Field of Search ........................ 379/207, 220, 379/269, 221, 219; 370/408, 254, 255, 256; 709/238, 239, 240, 241, 242; 340/825.02, 825.03, 825.8, 827

[56] References Cited

U.S. PATENT DOCUMENTS

| | | | |
|---|---|---|---|
| 4,348,554 | 9/1982 | Asmuth ............................... | 379/221 |
| 5,014,262 | 5/1991 | Harshavardhana ................... | 379/221 |
| 5,067,148 | 11/1991 | Sardana ............................. | 379/220 |
| 5,253,248 | 10/1993 | Dravida et al. ..................... | 370/228 |
| 5,452,351 | 9/1995 | Yammamoto ....................... | 379/221 |

*Primary Examiner*—Krista Zele
*Assistant Examiner*—Benny Q. Tieu
*Attorney, Agent, or Firm*—Tony E. Piotrowski

[57] ABSTRACT

The invention relates to a telecommunication system comprising a plurality of mutually coupled switching centers and at least one coupled control unit. When switching centers assign paths based on switching data stored in switching tables, switchings take place first between the coupled switching centers which have each their own switching tables containing LCR data. The respective switching center recognizes only the beginning and end of the path in the case of an incoming call, so that the call may be permanently switched to and fro between two switching centers leading to an endless loop in the case of a current overload or interruption of the path from the switching table. For realizing an improved switching environment while system features are taken into account, the control unit is provided for forming at least one connection tree which comprises as branches loop-free connections from one switching center and running to other switching centers of the telecommunication system and for converting the connection tree into a switching tree by determining pairs of switching centers in the branches and by erasing at least one branch that contains the respective pair in reverse order. This reduction creates loop-free switching trees from the connection trees, because an endless loop between two nodes is avoided with the switching operation. The respective branches correspond to the possible loop-free connections in the network. Since a switching tree is formed for each switching center, groups of loop-free connections for the whole telecommunication system evolve in this manner.

12 Claims, 4 Drawing Sheets

TELECOMMUNICATION SYSTEM WITH LOOP-FREE SWITCHING TABLES

BACKGROUND OF THE INVENTION

The invention relates to a telecommunication system comprising a plurality of mutually coupled switching centers and at least one coupled control unit.

The invention further relates to a control unit for a telecommunication system comprising a plurality of mutually coupled switching centers and a switching center for a telecommunication system comprising a plurality of mutually coupled switching centers and at least one control unit.

A switching center with an LCR function is known, for example, from U.S. Pat. No. 5,452,351 which function may be coupled to other switching centers in a telecommunication system. The LCR (Least Cost Routing) function as a criterion for the path assignment is a known feature which is rendered available especially in private telecommunication systems having a plurality of coupled switching centers. When there is a connection request from a user terminal, the associated switching center renders the path available to the desired user terminal that causes the least operating cost. These preferred paths are computed beforehand based on characteristic data (for example, charges per time unit, length of the time unit, instant of the connection request etc.) and stored in suitable form. Also alternative paths having respective priorities may be computed which paths are then selected when the optimum path cannot be used for the moment (for example, because of overload or interruption).

A plurality of user terminals are assigned to the switching center disclosed in U.S. Pat. No. 5,452,351. In addition, a control unit which includes storage means and processing circuits for LCR functions is assigned to the switching center.

A terminal which has a keyboard for inputting data and an LCD display for outputting data is connected to the control unit. The terminal supplies the control unit with LCR data which are stored in the storage means. When a request for a connection from one of the terminals of the private telecommunication system to an external user is generated, the control unit determines the path to the called other user terminal based on the LCR data stored in the control unit, which path causes the least operating cost per time unit.

LCR data is stored in tables in the storage means. Codes which are dialled when there is a request for a connection to an external user and which determine the path to the external user that involves the lowest operating cost are stored under specific addresses. The beginning and end of the path are then determined by the directory numbers of the called internal user and of the called external user.

When a path is assigned from the LCR point of view, it is highly advantageous to use one's own private telecommunication system for the greater part of the path. As a result, call transfers take place first between the coupled switching centers which contain their own switching tables with LCR data. For an incoming call, the respective switching center recognizes only the beginning and the end of the path from which the most favorable path for the further switching is determined by means of the LCR data. If this path cannot be used as a result of a current overload or interruption, the switching tables contain an alternative path. Since the addressed switching center does not know the previous route of the call, the call is permanently sent to and fro between two switching centers, so that an endless loop evolves. For that case, an additional feature is included in the network protocol, according to which all the calls that have passed through more than a certain number of switching centers are rigorously erased. The disadvantages resulting from this method, and also the time loss until the erasure, are obvious.

Naturally, in addition to a path assignment while least cost routing (LCR) is taken into account, it is also possible to establish the switching tables based on other points of view such as, for example, paths or transmission rate determined by the optimum load of the transmission capacity.

SUMMARY OF THE INVENTION

It is an object of the invention to provide a telecommunication system comprising a plurality of mutually coupled switching centers and at least one coupled control unit, which system makes an improved switching environment possible while system characteristic parameters are taken into account.

This object is achieved by a telecommunication system according to the invention in that the control unit is provided for forming at least one connection tree which comprises as branches loop-free connections from one switching center and running to other switching centers of the telecommunication system and for converting the connection tree into a switching tree by determining pairs of switching centers in the branches and by erasing at least one branch that contains the respective pair in reverse order. The telecommunication system is described by a network of nodes which represent the switching centers, and lines which feature the internal connections between the switching centers. For example, connection trees for all the nodes are generated from this network by means of an algorithm. Starting from the respective initial node, all possible connections in the network are formed as branches, each node occurring only once in a branch. By excluding these repetitions, connection trees having loop-free branches are formed. Each switching center then occurs once as an initial node, so that exactly as many connection trees exist as there are switching centers in the telecommunication system. For the formation may particularly be used a simple recursive algorithm which adds to each branch the neighbors of a respective node as long as they are not yet available in the branch generated thus far from the initial node to the node under consideration. This algorithm is used once for each node as an initial node.

The connection trees are converted so that the branches are erased that contain a pair of neighboring nodes in reverse order, which pair occurs in another branch. This reduction leads to making loop-free switching trees from the connection trees, because an endless loop between two nodes is avoided during switching. When each node in a switching tree is considered an edge node once, the respective branches from initial node to the respective edge node correspond to the possible loop-free connections in the network. This group of loop-free connections is assigned to the switching center that corresponds to the initial node. Since a switching tree is formed for each switching center, groups of loop-free connections for the whole telecommunication system will be the result.

In an advantageous embodiment, there is provided that the control unit influences the connection tree in such manner that the branches of the connection tree are processed consecutively and all the following branches that contain the reverse-order pair that has just been processed are erased. Starting each time from the initial node, all the branches are completely processed up to the edge node and then, for example, from left to right. Since the branches as such do not contain any nodes in twofold from the start, the node pair that has just been considered is compared with pairs of the remaining branches in the order given. If the considered pair a reverse order of the neighboring nodes is determined in another branch, preferably, this branch is erased and the processing continued in the next branch. It is then favorable for a fast processing time to arrange the connection tree in such manner that the shortest branches are examined first. When a pair is determined, long branches are then erased, which would need an accordingly long time for the examination.

Another advantageous possibility for processing the connection tree by the control unit is provided when the branches are processed in lexicographic order and all the following branches containing the reverse-order pair that has just been processed are erased. The order of the pairs considered in succession is then given in that the pairs are considered in stages from the initial node to the edge node. This is understood to mean that first the pairs of the first stage of all the branches, which is the stage that has the shortest distance to the initial node, is considered and after that the second stage of all the branches, and so on and so forth.

In a preferred embodiment there is provided that the control unit forms tables of switching data for switching centers from switching trees and stores these tables in a memory assigned to the control unit. The branches of the switching trees reduced according to the invention correspond to the possible loop-free connections in the network realized by the switching center for which the connection tree was formed. The control unit then generates switching data therefrom for each cooperating switching center, which switching data are stored in a table so that the control unit can access them in the event of a connection request from the switching center. As a rule, a plurality of switching options are provided for which first always the optimum (most cost-effective) option is selected and an alternative connection is used in the case of problems. This precalculation makes an optimum processing of a connection request possible without a loss of time caused by the control unit. Even when alternative data are necessary due to an occupied connection, no problems will occur, because the control unit can render various switching data per second available.

For a preferred embodiment of the invention, the switching centers include a switching data memory and a path assignment unit. More particularly, for switching centers in the network which are wide apart, the respective part of the table containing the switching data is stored in the assigned switching center itself. In the case of a connection request from a connected terminal, or in the case of a transfer to a terminal not connected directly, the path assignment unit accesses the data and then renders the most favorable connection available. As a result, it is no longer necessary to access a central control unit, which leads to a simplified structure of the network. It is advantageous to assign a path while taking the least cost routing into account. This least cost routing (LCR) path assignment method is a known feature in switching centers.

A further advantage is achieved when at least one switching center comprises a PC which includes the respective switching data memory and the path assignment unit. Realizing the two functions in one PC provides a very simple operability during maintenance of the switching center. New switching data may also be installed without specialized experts by means of known operator interfaces on the PC. Furthermore, this provides the advantage of the considerably larger storage capacity in a PC as against a conventional switching center. As, furthermore, conventional elements may be used, this is a cost-effective solution.

In an advantageous further embodiment, the switching data are applied to the assigned switching centers by means of data communications. Particularly the telecommunication system may be used for this purpose. It is also conceivable for the switching data to be rendered available by means of a data carrier (for example, a diskette) which data carrier is installed directly in the switching center. This method would also provide enhanced data security.

In another promising embodiment of the invention there is provided that a switching center includes a control unit which forms the switching trees assigned to the switching center. As a result, intelligent switching centers evolve which autonomously form the necessary switching trees. When the data about the architecture of the telecommunication system are rendered available to the switching centers, the calculation for forming the table with the switching data may be carried out locally. Advantageously, the control unit may also be arranged as a PC (Personal Computer), which corresponds to a cost-effective and user-friendly realization. The parameters necessary for the calculation (for example, also exact price tables) may be supplied as described above.

A possible embodiment of the telecommunication system according to the invention will be further explained with reference to the Figures. The exemplary embodiment describes a telecommunication system with switching centers which render loop-free connections available by means of stored switching data, which loop-free connections correspond to the least cost routing (LCR).

These and other aspects of the invention will be apparent from and elucidated with reference to the embodiments described hereinafter.

DESCRIPTION OF THE PREFERRED EMBODIMENTS

Figure 1:
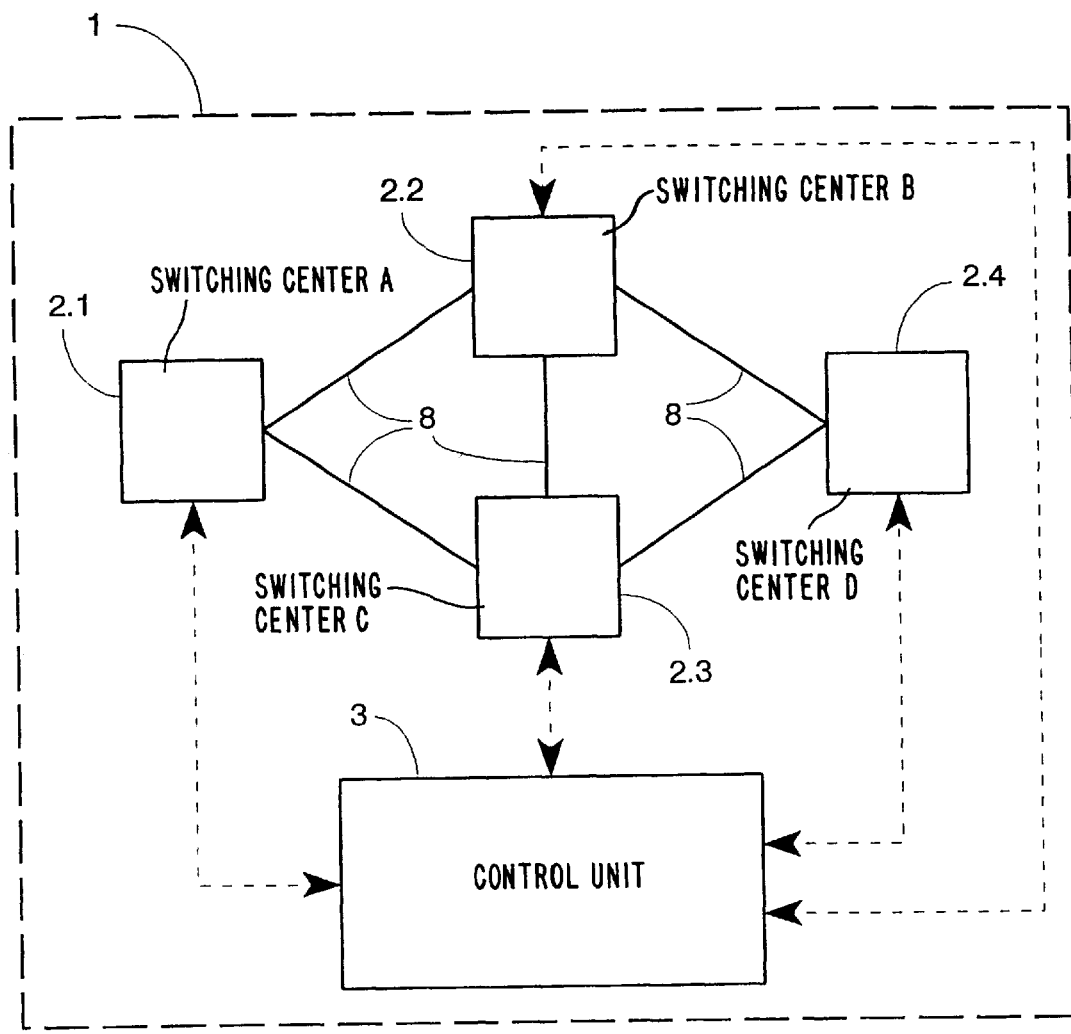
FIG. 1 gives a diagrammatic representation of a telecommunication system including 4 switching centers and a coupled control unit.

In FIG. 1 is shown a telecommunication system 1 which includes 4 switching centers (VS) 2.1, 2.2, 2.3 and 2.4 as well as a control unit 3. The switching centers 2.1–2.4 are connected to each other via the lines 8 shown and thus form a private network. The control unit 3 is coupled to all the switching centers 2.1–2.4, so that a control of the respective switching function is made possible. Arbitrary terminals as well as transitions to the public or other external networks may be connected to the switching centers 2.1–2.4.

Figure 2:
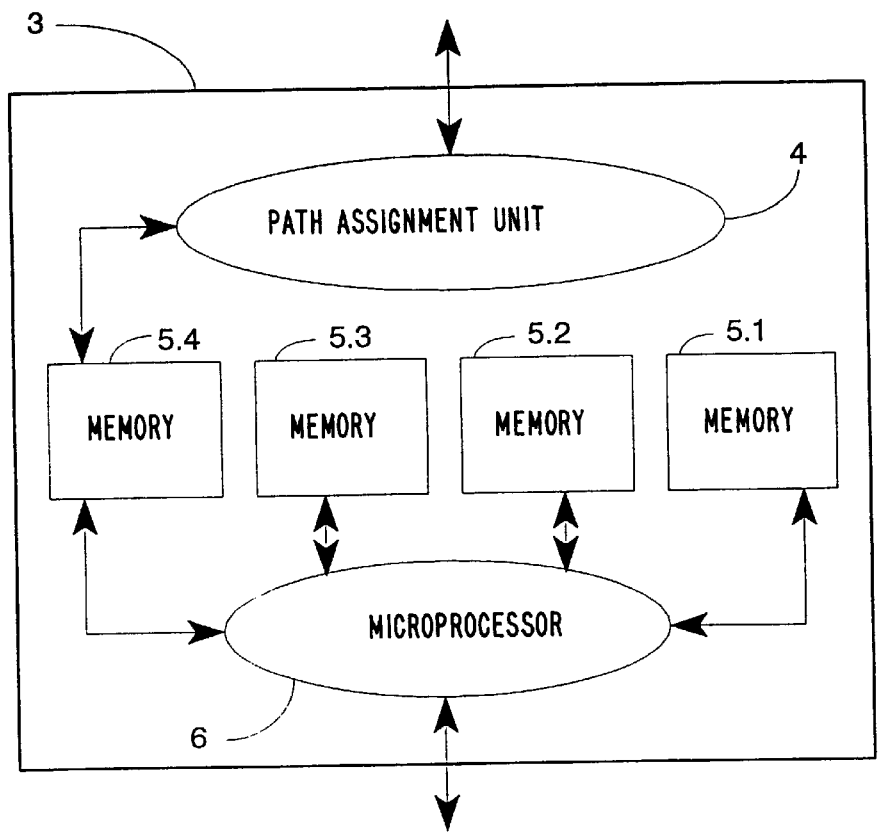
FIG. 2 shows a block circuit diagram of a control unit.

The structure of the control unit 3 is described in more detail with reference to the block circuit diagram of FIG. 2. A microprocessor 6 receives the parameters describing the network through a terminal, for example, a keyboard connected to a display. These parameters include information with respect to the structure of the private network 1 and information on where and under what conditions transitions to external networks are possible. The microprocessor 6 is coupled to a memory 5 which is subdivided into 4 areas. Memory area 5.1 stores the network architecture, network area 5.2 the connection trees, memory area 5.3 the switching trees and memory area 5.4 the tables containing the switching data. The calculations are carried out by the microprocessor 6 in which the respective algorithms are implemented as software. The path assignment unit is coupled to the memory area 5.4, so that the switching data of the connected switching center 2 can be transferred.

Figure 3:
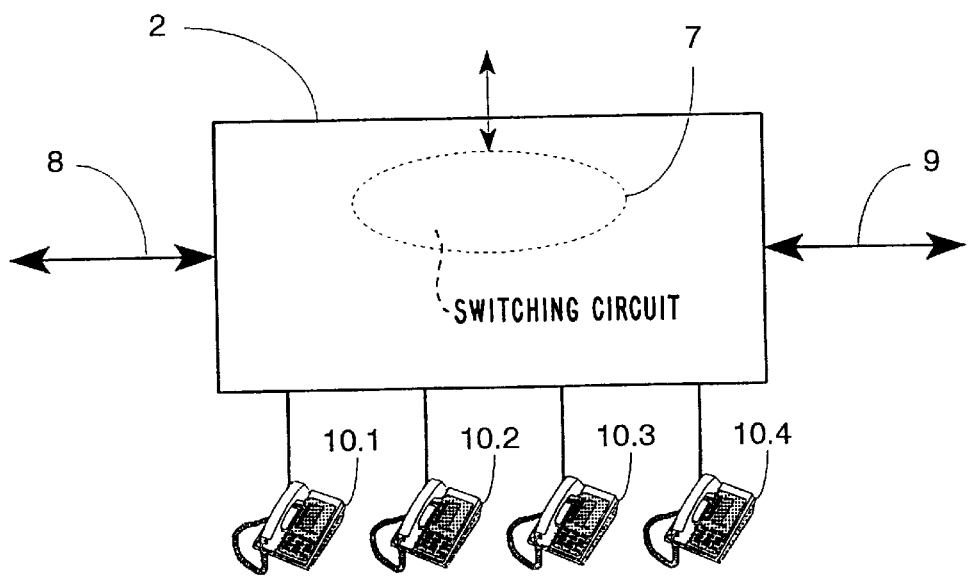
FIG. 3 shows a block circuit diagram of a switching center.

FIG. 3 describes the structure of a switching center 2 in more detail. A switching circuit arrangement 7 is therein coupled to a path assignment unit 4. The internal lines 8 of the private network and lines to external networks 9 and terminals 10.1 to 10.4 are connected to the switching center 2. The internal lines 8 may be considered preferred lines, more particularly from the point of view of LCR, whereas the external lines 9 have a lower priority for the path assignment. Side by side with the telephones shown 10.1, 10.2, 10.3 and 10.4, it is obviously possible to use other telecommunication devices as terminals too. In the case of a connection request to a terminal outside a terminal's own switching center 2, the circuit arrangement 7 renders a connection available by means of the path assignment unit 4. For selecting the connection that is the most suitable, the path assignment unit 4 searches the table 5.4 for the switching data based on the dialed code (telephone number), which data are transmitted to the circuit arrangement 7. The switching center 2 then establishes the connection to a next switching center. If the connection to the next switching center cannot be established as planned, for example, because of an occupied line, the switching data of an alternative connection are procured by means of the path assignment unit 4. An incoming call which is not intended for a terminal connected to this switching center is also transferred in this manner. The calls are transferred from one switching center 2 the next, so that each switching center 2 is to have the respective switching data 5.4 available. Each switching center recognizes only the beginning and end of the requested connection.

Figure 4:
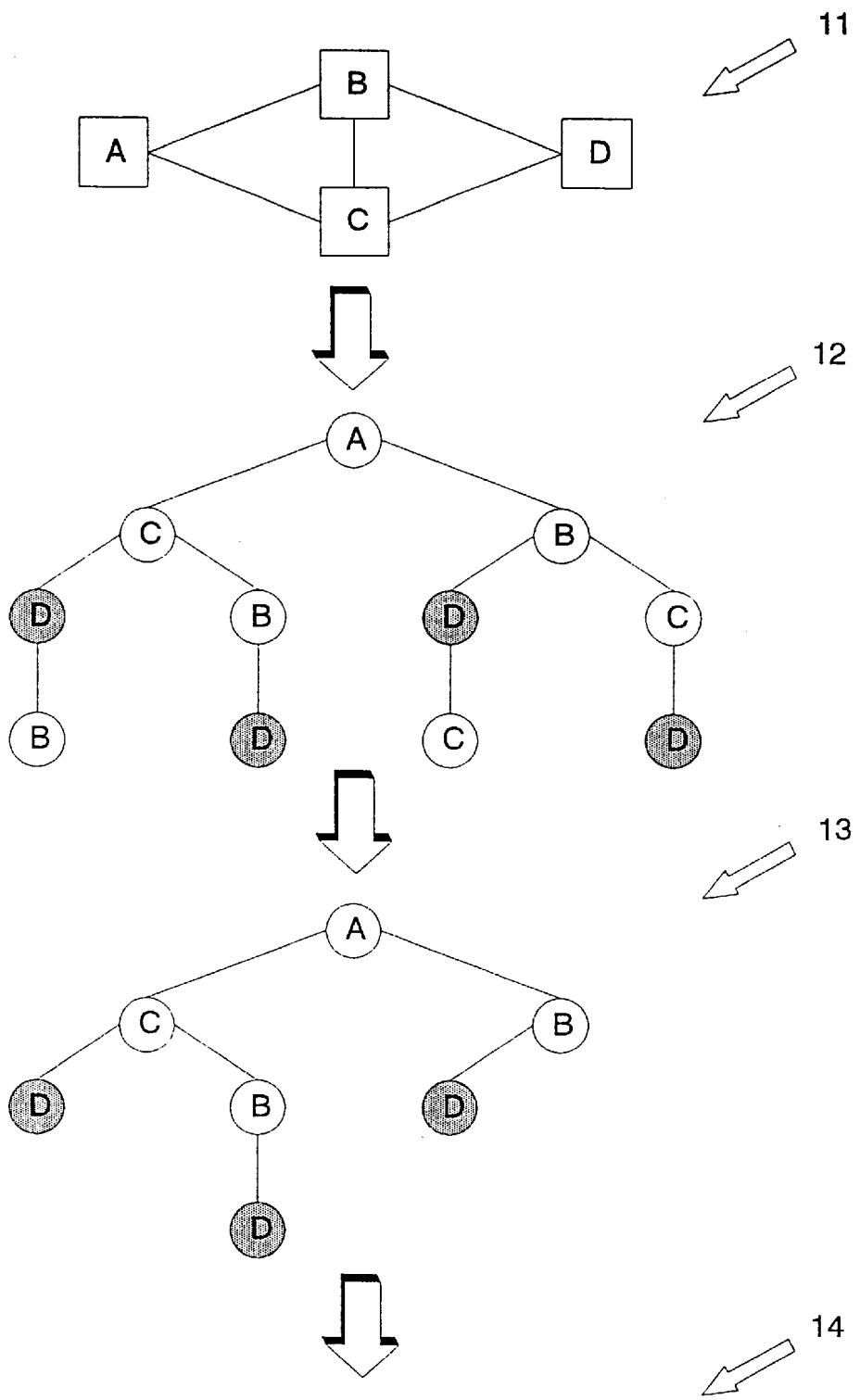
FIG. 4 shows a diagram which shows the procedure for the calculation of switching data, and FIG. 5 gives a diagrammatic representation of an embodiment of a telecommunication system according to the invention.

With respect to the network 11 FIG. 4 describes the calculation of a table of switching data 14 from a connection tree 12 via a switching tree 13. The switching centers 2.1 to 2.4 are represented by the nodes A, B, C and D and the internal connections 8 by the lines. This network architecture is stored in the memory area 5.1 as information about the network 11. In the following there will only be explained the optimization according to the invention of the switching inside the private network 11, so that transition possibilities to public and/or other external networks are not shown. There is assumed that first the most cost-effective connection is used in principle, so that for more transition possibilities maximum use is made of the internal connections 8.

The microprocessor 6 converts the nodes A–D and lines of the network 11 into a group of connection trees by means of a simple recursive algorithm, while each node forms the root of a connection tree 12. FIG. 1 shows the connection tree 12 for nodes A. The connection trees are structured in such a way that each node occurs only once in a branch from the root to the respective leaf. The following algorithm makes the formation of loop-free branches possible:

tree: =root;
start:
for each leaf L of tree do

```
{       for each successor S of L do
        {if S is already in the path root −L
        then ignore S
        else add S to tree [making the new tree]
        }
}
``` if new tree =old tree
  then return [finish the conversion]
  else go to start [continue with new tree]
This algorithm adds a further node as a leaf to each branch in each connection tree if this node has not yet occurred in the branch thus far.

Subsequently, each node in the connection tree 12 is examined consecutively. FIG. 4 is a representation of the node D as a target node. There are four possible connections from the root node A to the target node D in the connection tree 12: ACD, ACBD, ABDC, ABCD. If all four connections of the switching center 2 were rendered available, no loop-free switching would be guaranteed if an alternative path were assigned due to occupied lines. As mentioned above, a path assignment is carried out in each switching center 2 that takes part, which assignment is based on the respective switching data. If all the connections A-D were converted into switching data, with a root node A and a leaf node D, the following would hold for the nodes that take part:
A: switch to B or C
B: switch to D or C (or connection ABCD)
C: switch to D or B (or connection ACBD)
When the connections B–D and C–D are occupied, B switches to C on the basis of its switching data and C switches back to B. In this manner an endless loop evolves in which the call is lost.

Consequently, the number of connections rendered available to the switching centers 2 are to be reduced significantly. The connection tree 12 is shortened by the branch ABCD, so that a switching tree 13 arises which is stored in the memory area 5.3. Furthermore, the non-participating nodes are omitted in the representation of the branches.

The switching tree 13 provides for the connection A–D a group {ACD, ACBD, ABD] 14, from which are generated the switching data for the nodes that take part. The computation of the switching tree 13 is effected by means of an algorithm which is implemented in the microprocessor 6. The following steps are then carried out:
Sort the branches of the connection tree 12 from left to right (ACD, ACBD, ABD,ABCD)
Examine each connection A–D having more than three nodes for node pairs:
When the connection A-B-C-D is examined, erase all connections which include the pair CB (BC in reverse order), i.e. A-C-B-D from the remaining connection tree 12 that has not yet been examined. The switching tree 13 obtained in this manner is converted into switching data for all the participating nodes, so that loop-free switching in the network 11 is made possible.

The course of the algorithm for the connection tree 12 will be shown in the following by way of example:
Examine ACD: No erasure, ACD is a branch of the switching tree,
Examine ACBD: Erase ABCD due to pair CB in ACBD,
Examine ABD: No erasure, ABD is a branch of the switching tree.
Therefore, there remains the group of connections 14 {ACD, ACBD, ABD}.

For the network 11 in the exemplary embodiment it holds that no connection having up to 3 nodes may have an effect on another connection from A to D, because either a pair having node A on the second position (XA), nor a pair having node D on the first position (DX) can occur in the connection tree 12 and can be erased as a result.

A further possibility of computing a switching tree 13 for loop-free switching in the network 11 is realized with the algorithm to be described in the following, which is also implemented in the microprocessor 6.

Examine the connection tree 12 in pairs in lexicographic order, i.e. examine the pairs in the branches from top to bottom and also from left to right in one stage, When the examined pair is, for example, BC, erase all the connections A-D containing the pair CB (BC in reverse order).

The course of this algorithm for the connection tree 12 will be shown in the following by way of example:

Examine AC: No erasure, because XA does not exist, see below,

Examine AB: No erasure, because XA does not exist, see below,

Examine CD: No erasure, because DX does not exist, see below,

Examine CB: Erase ABCD due to pair CB in ACBD,

Examine BD (ABD): No erasure, because DX does not exist, see below,

Examine BD (of ACBD): No erasure, because DX does not exist, see below.

Therefore, there remains the group of connections 14 {ACD, ACBD, ABD}.

Again it holds that the pairs AX and XD need not be examined, because they cannot occur in reverse order, that is to say, neither a pair having node A on second position (XA), nor a pair having node D on first position (DX) exists in the connection tree 12 and can therefore be erased.

Figure 5:
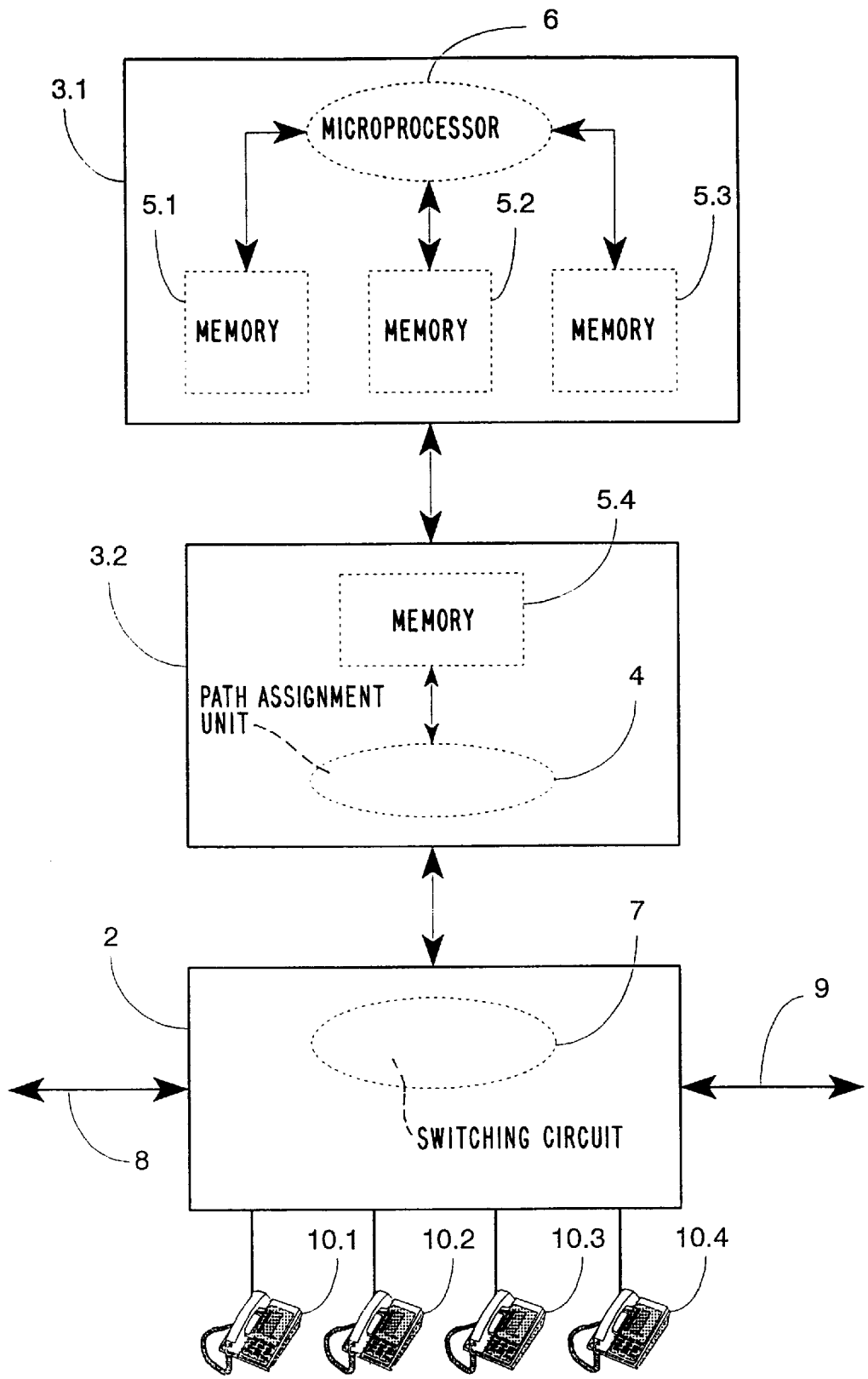

FIG. 5 shows an exemplary embodiment of the telecommunication system 1 according to the invention in which the control unit 3 was divided so that the path assignment unit 4 and a memory 5.4 area containing tables of switching data were taken separately in part 3.2. These functions are available to each switching center 2 and coupled directly or already included. The switching center 2 includes the switching circuit arrangement 7 which is connected, on the one hand, to the path assignment unit 4 and, on the other hand, to internal lines 8 and external lines 9 and also to the terminals 10.1, 10.2, 10.3 and 10.4. The remaining part of the control unit 3.1 includes the microprocessor 6 and the memory areas 5.1, 5.2 and 5.3 which have the same function as in the control unit 3. The part 3.1 need not be available to each separate switching center 2, but can execute the computations for the network 1 centrally. The microprocessor 6 computes the switching data for each node from the switching trees stored in the memory area 5.3. These switching data are transmitted, for example, by data communications or via a data carrier to the memory area 5.4 of the respective switching center 2. The part 3.2 is arranged as a PC, so that a modification of the switching data on the spot may also be carried out by less qualified experts. The new data are loaded in conventional manner via a user-friendly operator interface.

Modifications of the switching data are centrally computed by the part 3.1 in the case of modifications of ambient parameters (for example, new tables of costs or a newly offered external network). The generated data may then be simultaneously installed on each node in a decentralized manner.

What is claimed is:

1. A telecommunication system comprising:
    a plurality of switching centers and;
    at least one control unit, connected to said plurality of switching centers, arranged to form at least one connection tree which includes as branches loop-free connections from at least one switching center to at least another switching center of the telecommunication system, and to convert the connection tree into a switching tree by determining pairs of switching centers in the branches and by erasing at least one branch that contains the respective pair in a reverse order.

2. The telecommunication system as claimed in claim 1, wherein the control unit converts the connection tree so that the branches of the connection tree are processed consecutively and all subsequent branches that contain a reverse-order pair that has already been processed are erased.

3. The telecommunication system as claimed in claim 1, wherein the control unit converts the connection tree so that branches are processed in lexicographic order and all subsequent branches containing a reverse-order pair that has already been processed are erased.

4. The telecommunication system as claimed in claim 1, wherein the control unit is also arranged to form at least one table of switching data for the plurality of switching centers from the switching tree and store the table in a memory accessible by the control unit.

5. The telecommunication system as claimed in claim 4, wherein the switching centers include a switching data memory and a path assignment unit.

6. The telecommunication system as claimed in claim 5, wherein at least one switching center comprises a computer which includes the switching data memory and the path assignment unit.

7. The telecommunication system as claimed in claim 5, wherein the switching data is applied to an assigned switching center through a data communication medium.

8. The telecommunication system as claimed in claim 1, wherein one of the plurality of switching centers includes the control unit which forms the switching trees) assigned to the switching center.

9. A control unit for a telecommunication system including a plurality of switching centers, said control unit comprising:
    a controller arranged to form at least one connection tree which includes as branches loop-free connections from at least one switching center to another switching center of the telecommunication system, and to convert the connection tree into a switching tree by determining respective pairs of the plurality switching centers in the branches and by erasing at least one branch that contains a respective pair in reverse order.

10. A method for a telecommunication system including a plurality of switching centers, said method comprising the steps of:
    forming at least one connection tree which includes as branches loop-free connections from at least one switching center to another switching center of the telecommunication system; and
    converting the connection tree into a switching tree by determining respective pairs of the plurality of switching centers in the branches and by erasing at least one branch that contains a respective pair in reverse order.

11. The method according to claim 10, wherein said converting step includes processing branches of the connection tree consecutively and wherein all subsequent branches that contain a reverse-order pair that has already been processed are erased.

12. The method according to claim 10, wherein said converting step includes processing branches of the connection tree in lexicographic order and wherein all subsequent branches containing a reverse-order pair that has already been processed are erased.

* * * * *